United States Patent Office 2,794,778
Patented June 4, 1957

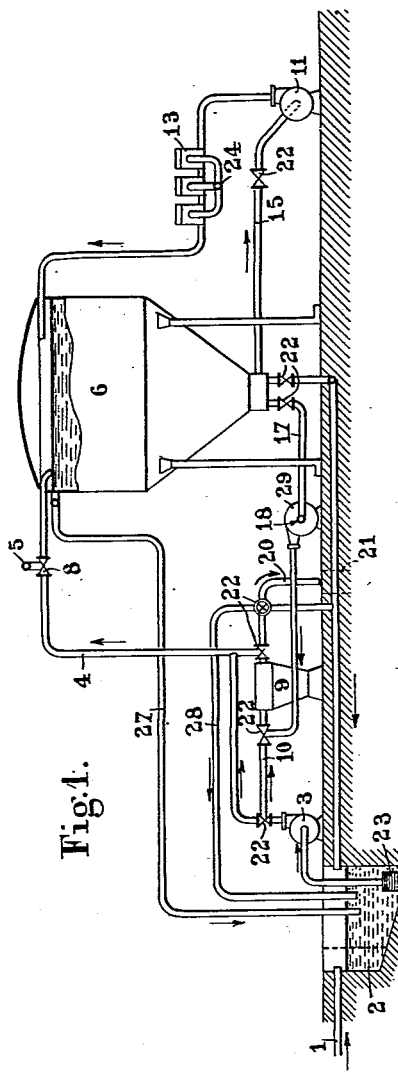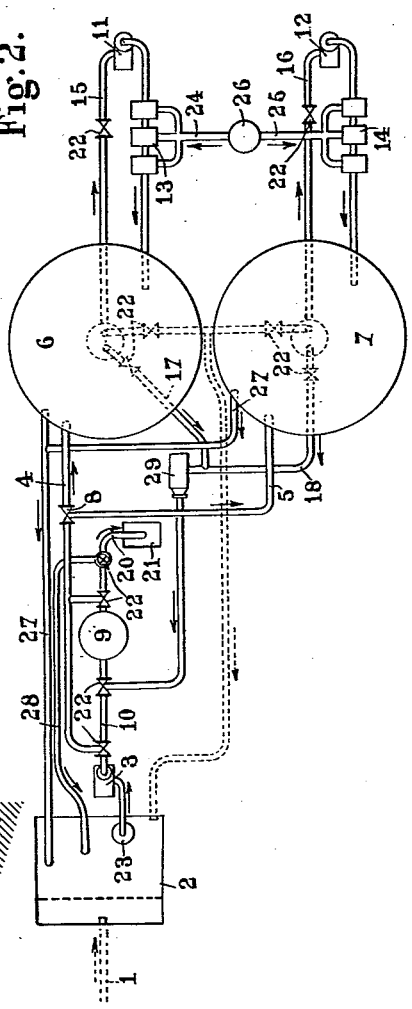

2,794,778

PROCESS AND INSTALLATION FOR THE TREATMENT OF FERMENTISCIBLE INDUSTRIAL RESIDUARY WATERS

Yves Vrignaud, Paris, France, assignor to Société Anonyme dite: Fromageries Bel, Paris, France Application October 2, 1953, Serial No. 383,859

Claims priority, application France November 5, 1952

5 Claims. (Cl. 210—15)

Numerous processes have already been proposed for the treatment of industrial residuary waters and particularly of residuary waters from the milk industries; it has been proposed, in particular, heretofore to treat said waters by an aerobic treatment, flocculation and separation, possibly after a first preliminary separation of the heaviest solid elements in suspension. None of these former processes, however, has proven entirely satisfactory in use, particularly for treating residuary waters from the milk industries.

It was found, according to the present invention, that an excellent result could be obtained in an industrial manner by a treatment of the above-mentioned type, in which the waters are subjected to a first operation in a closed circuit, a flocculation agent being added to them towards the end of this first aeration, are then allowed to rest for allowing flocculation to take place and the waters to clarify, then subjected to a second closed circuit aeration, and finally subjected to a final separation which stops the muds and allows the purified waters to flow away.

In some cases, this process may be improved by subjecting the waters to be purified to a preliminary purification; thus, in particular, an aeration range may conveniently be immersed in the receiving tank and the aeration may be continued as long as there is any residuary water to be treated.

The main aeration may be effected inside treating tanks; to this effect an aeration system may be immersed in said tanks, as for example perforated tubes, porous tubes, porous plates or any other device making it possible to diffuse air through the mass in circulation.

The process according to the invention and the installation for the application of said process have, with respect to processes and installations known at present a complete set of technical advantages, a set which could be obtained with none of them.

1. Anaerobic fermentations such as happen in septic tanks or decantation tanks are radically eliminated hence, also their consequences: in particular the formation of evil smelling substances, often toxic, by anaerobic degradation of organic compounds.

2. The centrifugal separating of the elements in suspension is rapid and efficient. It acts both on heavy elements such as earthy substances and on light elements such as fats, the latter too often clogging the purifying mechanism and spreading the pollution in time and in space.

3. The substances in solution capable of creating an acidity momentarily clogging the purifying in the processes which do not strictly eliminate anaerobia are destroyed or eliminated. They cannot, therefore, jeopardize the biological purification work or be the causes of delayed nuisances.

The residuary waters which have been treated by the process according to the present invention have lost their fermentiscible and reducing nature, as well as their potential of transformation of the ionic energy of the receiving medium; their bacterial charge is very low and the degradation products of the organic materials are not toxic.

The waters thus purified may be dumped in water streams even of small rate of flow, or over lands without causing any troubles on the fauna, flora, ground or underground sheets.

Not only is the purification of waters efficient, but the installation according to the process has advantages of its own:

1. A small bulk, owing to the absence of stocking.

2. No evil smell, due to operating under conditions which eliminate strictly all anaerobic fermentations.

3. Extraction muds are of small volume.

4. The efficiency of the installation is not jeopardized by a long period of operation or by the introducing of an abnormal fouling load.

5. The necessary equipment can rapidly be assembled or disassembled and installed again without any important civil engineering work. Being of small bulk, it can be mounted inside the factory. The initial installation costs are substantially lower than those which would be required, for an equal fouling load, by the installation of a conventional biochemical purification station. The purifying station being easy to control may be entrusted to a personnel which need not be numerous nor particularly skilled, which diminishes still further the operating costs.

By way of non-limitative example, there is described herein after the installation and operation according to the invention, of a station for treating the residuary waters from an industrial dairy, the latter term applying to any factory for the transformation, storing or conditioning of milk and its derivatives.

The appended drawing shows, by way of example, an installation for the putting in application of the process according to the present invention.

Figures 1 and 2 are views respectively in elevation and in plan.

Figure 3:
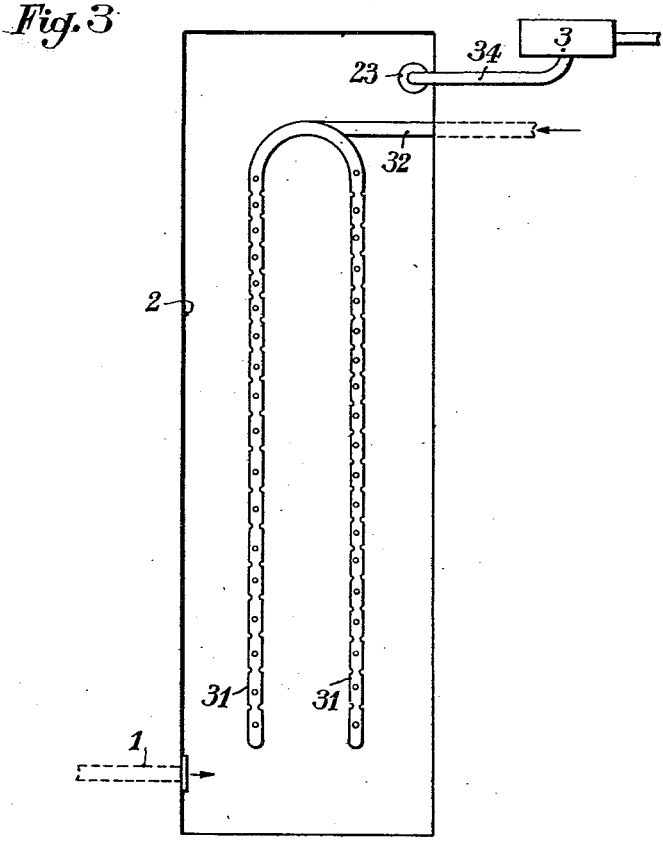
Figures 3 and 4 are also views, respectively in plan and in transverse section, on a larger scale, of one of the elements shown in the previous figures.

The water arriving from the sewer through the duct 1 flows into the suction sump 2 whence, through a strainer 23, the pump 3 can send it, through conduits 4 or 5, towards one of the treating tanks 6 or 7, according to the position of the cock 8; a centrifugal separator 9 is inserted on the section 10, common to conduits 4 and 5.

To each tank 6 and 7, the number of which may vary according to the importance of the installation and the volume of waters to be treated, a circulation pump 11, 12 is associated, and an aerator 13, 14 supplied by a blown air conduit 24, 25 connected with the air compressor 26, so that the water flows in a closed circuit from the tank, through the conduit 15, 16, through the aerator 13, 14 and back to the tank.

The waters may then be taken again from the tanks 6 and 7 through conduits 17 or 18 according to the positions of the cocks 22, the pumps 3 and 29, the conduit 10, the separator 9 and sent back either in a closed circuit to the tanks 6 or 7, or through the conduit 20 to the sewer 21 for the evacuation of purified waters.

The installation is completed by all the necessary cocks, 22, ducts 27 for the overflows from the tanks 6 and 7 and a conduit 28 for the return of the output of the separator 9 to the sump 2 with a view to a new treatment in case it should be found that, for one reason or another, the purifying is insufficient.

The operation is as follows:

After a preliminary separation, the various tanks are filled alternately.

When a tank is full, the residuary water it contains is put in circulation on the corresponding aerating apparatus which diffuses air through the mass and sends the aerated water back to the tank; the first operation lasts about two hours, the water flows a second time through the aerator, for a variable time, never less than four hours.

Towards the end of the first operation of circulation and aeration, the chemical products for accelerating flocculation are introduced. These chemical products may consist of a mixture of iron and calcium salts. A usual proportion for residuary waters from a modern cheese dairy making pressed paste cheese and using also, for other purposes, a volume of lacto-serum equal to 75% of the volume of milk treated is 600 cm.³ of a solution of ferric chloride at 60° Bé., 400 grams of unslaked lime per cubic meter of treated water.

The iron salts are first introduced, then ten minutes later, the lime, previously slaked, in solution in a few litres of water.

At this stage of the treatment, the circulation ensures a good distribution of the flocculating products throughout the mass of liquid.

After a quarter of an hour, the circulation is stopped and the liquid allowed to stand for an hour. The tanks, preferably, have conical bottom, with a fairly small apex angle, so that the muds may be rapidly evacuated, either toward the aeration circuit or toward the circuit for centrifugal separation. Flocculation is very abundant, and the clarifying of the liquid very rapid; at this stage, however, the clear liquid is still fermentiscible.

The circulation pump is restarted and the contents of the tank are again circulated through the aerator for a duration of six to twelve hours, according to the fouling load.

Circulation is then stopped and the muddy output is sent back to the centrifugal separator which stops these muds and allows the purified liquid to flow to the evacuation sewer.

Figure 4:
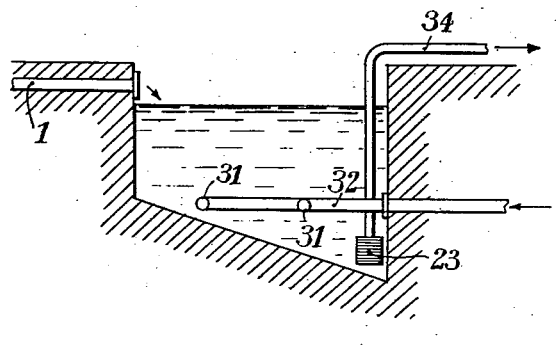

In the variant shown in Figures 3 and 4, inside the suction sump 2 and at its lower portion, ranges of perforated tubes 31 are arranged, longitudinally, and are supplied with compressed air through the conduit 32; the raw spent waters arrive at the receiving tank through the conduit 1 and they are sucked, through the conduit 34, protected by the strainer 23, by the pump 3 which directs them, in particular, towards the treatment tanks.

There will be given hereinafter a practical example of a treatment of residuary waters from the milk industries.

The water from the collecting drain of the plant is received in a cement vat, after passing through a filter capable of stopping large impurities.

The effluent is immediately pumped and sent into one of the process tanks; aeration begins immediately by a circulation of the residuary water in the aerator circuit; it is continued for the whole duration of the filling and, in addition, two hours after the end thereof.

At that moment, the pH is summarily determined and iron salts are added, preferably in the shape of sulphate; the amounts of iron are all the higher as the pH is higher; they vary normally between 20 and 35 kg. for a tank containing 30,000 litres of effluent. The effluent being in circulation on the aerators, the mixing of the iron salts is rapid. In order to facilitate this operation, the sulphate is used in a concentrated solution.

The lime is then sent into the tank in a sufficient proportion for bringing the pH back to a value higher than pH 7, but which should never exceed pH 8. After the admixture of lime milk, the circulation is kept up for 15 to 20 minutes, for ensuring a homogeneous distribution.

The circulation is then stopped for allowing the flocculation to take place in the best conditions. As soon as the latter is ended and the flocculation product has settled, which requires from 40 to 60 minutes, the circulation is reestablished over the aerators for two hours at least. At that stage, the sludge formed is oxidized and its colour makes it possible to see when the treatment is finished. The sludge, which was blue, or green, becomes brick red. To reach that stage it is sometimes necessary to aerate for more than two hours, which does not alter anything in the initial process.

When the oxidizing is deemed sufficient, the water and its flocculation product are sent to the centrifugal separators where the sludge settles immediately and the clear effluent is sent to the sewer network or to the river.

The waters from cheese factories, for instance, are received with D. B. 0.5 of 1200 to 5–6,000 as in all cases, they contain some lactose, more or less. The latter always arrives with serum, i. e. at the times corresponding to the work of the rennet and moulding shops. The residuary waters corresponding to these working hours undergo systematically a longer aeration in the first stage.

Practice, in a factory, makes it possible to know rapidly the peak load hours when a laboratory has not already done it.

The treated effluents arrive at very low D. B. 0.5, of the order of 30 to 50, with initial D. B. 0.5 not exceeding 4000, which means that the results are very satisfactory.

This process is applied regularly in the cheese factory at Laumes (Cote d'Or) and no polluting of the small trout brook is found, while previously all aquatic life has disappeared.

What I claim is:

1. A process according to claim 5, in which the first aeration lasts about 2 hours, the waters are allowed to stand during flocculation for about 1 hour, and the second aeration lasts a minimum of about 4 hours.

2. A process according to claim 5, in which the raw spent waters are subjected to a preliminary aeration before said first aeration.

3. An installation for the treatment of residuary waters comprising a single settling tank, a pump and a first conduit connected to said settling tank for bringing the residuary waters to said tank, a closed circuit including said settling tank and comprising a pump and an aerator adapted to inject air through the waters circulated by said pump from and to said tank, a centrifugal separator, and a second conduit connecting the tank with the centrifugal separator and having an extension for evacuating the purified waters issuing from the separator.

4. An installation according to claim 3 wherein said first conduit includes said centrifugal separator whereby the pump brings the residuary waters to the tank through the separator.

5. A method of treating waste waters from the milk industries and like fermentiscible industrial residuary waters, by aerobic purification, flocculation and separation, which consists in the steps of circulating said waters in a closed circuit, effecting a first aeration of said waters by injecting air therethrough as they are being circulated, adding a flocculating agent substantially upon completion of said first aeration, discontinuing said circulation and maintaining said waters still until said flocculation has taken place and said waters have been clarified, re-circulating said waters in a closed-circuit while subjecting said waters to another air injection as they are being circulated, and finally effecting a centrifugal separation to retain the sludge and to separate the clean waters therefrom.

References Cited in the file of this patent

UNITED STATES PATENTS 1,915,240  Putnam       June 20, 1933

OTHER REFERENCES

Trebler et al.: Sewage Works Journal, vol. 10, pp. 884–886 (1938).